United States Patent

Stein

[15] 3,647,967

[45] Mar. 7, 1972

[54] TELEGRAPHY RECEIVER FOR HARMONIC TELEGRAPHY

[72] Inventor: Michel Guy Pierre Stein, Bazoches sur Guyonne, France

[73] Assignee: Societe Anonyme Telecommunications Radioelectriques et Telephoniques T.R.T., Paris, France

[22] Filed: Feb. 25, 1970

[21] Appl. No.: 14,042

[30] Foreign Application Priority Data

Feb. 26, 1969 France ..................................6923464

[52] U.S. Cl. ................................178/88, 178/66 R, 178/68, 325/30, 325/38 A, 325/320, 325/321

[51] Int. Cl. ........................................H04b 1/16, H03k 9/06

[58] Field of Search ....................178/66, 67, 68, 88; 325/30, 325/320, 321, 38 A; 329/126

[56] References Cited

UNITED STATES PATENTS 3,543,172 11/1970 Seppler...............................178/66 X

*Primary Examiner*—Robert L. Griffin
*Assistant Examiner*—Kenneth W. Weinstein
*Attorney*—Frank R. Trifari

[57] ABSTRACT

A multichannel telegraphy receiver for harmonic telegraphy where for each channel different levels of an input signal are characterized by different frequencies of the carrier. The receiver comprises for each receiver channel a discriminator including a digital counter, a continuously active counting pulse generator coupled to the input of the counter and a decoder connected to the counter and having an output circuit formed by a register. The register has a separate output for each of the different levels of the input signal. A zero-crossing detector in the input circuit of the receiver channel provides reset pulses to the counter and input pulses for the register.

4 Claims, 26 Drawing Figures

Patented March 7, 1972

3,647,967

8 Sheets-Sheet 1

Figure 1:
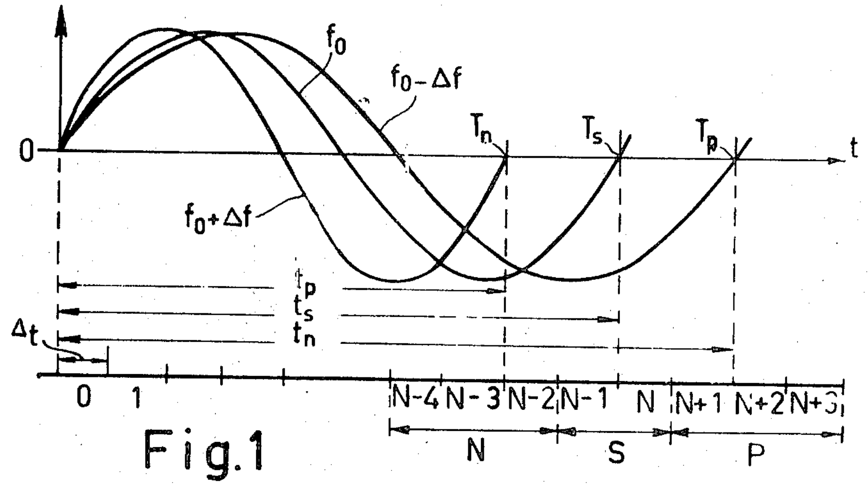

INVENTOR.
MICHEL GUY PIERRE STEIN

BY

AGENT

INVENTOR.
MICHEL GUY PIERRE STEIN
BY
AGENT

*INVENTOR.*
MICHEL GUY PIERRE STEIN
*BY*
AGENT

INVENTOR.
MICHEL GUY PIERRE STEIN
BY
AGENT

INVENTOR.
MICHLE GUY PIERRE STEIN
BY
[signature]
AGENT

| | fo | F | fo-Δf | fo | fo+Δf |
|---|---|---|---|---|---|
| 1 | 420 | 3 004 800 | 390 | 420 | 450 |
| 2 | 540 | 2 486 400 | 510 | 540 | 570 |
| 3 | 660 | 3 715 200 | 630 | 660 | 690 |
| 4 | 780 | 2 595 200 | 750 | 780 | 810 |
| 5 | 900 | 3 454 400 | 870 | 900 | 930 |
| 6 | 1 020 | 2 219 200 | 990 | 1 020 | 1 050 |
| 7 | 1 140 | 2 771 200 | 1 110 | 1 140 | 1 170 |
| 8 | 1 260 | 3 385 600 | 1 230 | 1 260 | 1 290 |
| 9 | 1 380 | 2 031 200 | 1 350 | 1 380 | 1 410 |
| 10 | 1 500 | 2 400 000 | 1 470 | 1 500 | 1 530 |
| 11 | 1 620 | 2 799 200 | 1 590 | 1 620 | 1 650 |
| 12 | 1 740 | 3 228 800 | 1 710 | 1 740 | 1 770 |
| 13 | 1 860 | 3 689 600 | 1 830 | 1 860 | 1 890 |
| 14 | 1 980 | 2 090 400 | 1 950 | 1 980 | 1 010 |
| 15 | 2 100 | 2 352 000 | 2 070 | 2 100 | 2 130 |
| 16 | 2 220 | 2 628 000 | 2 190 | 2 220 | 2 250 |
| 17 | 2 340 | 2 920 000 | 2 310 | 2 340 | 2 370 |
| 18 | 2 460 | 3 227 200 | 2 430 | 2 460 | 2 490 |
| 19 | 2 580 | 3 549 600 | 2 550 | 2 580 | 2 610 |
| 20 | 2 700 | 3 888 000 | 2 670 | 2 700 | 2 730 |
| 21 | 2 820 | 2 120 400 | 2 790 | 2 820 | 2 850 |
| 22 | 2 940 | 2 304 800 | 2 910 | 2 940 | 2 970 |
| 23 | 3 060 | 2 496 800 | 3 030 | 3 060 | 3 090 |
| 24 | 3 180 | 2 696 400 | 3 150 | 3 180 | 3 210 |

Fig.16

INVENTOR.
MICHEL GUY PIERRE STEIN
BY
Frank R. Trifari
AGENT

Patented March 7, 1972 3,647,967

8 Sheets-Sheet 7

INVENTOR.
MICHEL GUY PIERRE STEIN
BY
AGENT

INVENTOR.
MICHEL GUY PIERRE STEIN
BY
AGENT

TELEGRAPHY RECEIVER FOR HARMONIC TELEGRAPHY

The invention relates to a multichannel telegraphy receiver for harmonic telegraphy wherein for each channel different levels of the input signal are characterized by different frequencies of the carrier.

Telegraphy receivers of the above-mentioned type are well known to have the drawback of being comparatively sensitive to changes in atmospheric conditions, such as variations in temperature, humidity, etc. It has been found that the required frequency stability in the conventional telegraphy receivers which, as is common practice, are provided with coils is difficult to obtain due to this unwanted atmospheric influence. In the case of a receiver operating at three different frequencies per channel and a transmission speed of 50 Bd this atmospheric influence leads, for example, to a requirement of frequency accuracy in the order of 1/1000.

These known telegraphy receivers thus include frequency control loops for establishing the required frequency stability. This, however, results in rather complicated circuit arrangements, due to the great number of frequencies (for example, 72 different frequencies for a 24-channel receiver at 3 frequencies per channel).

It is an object of the present invention to provide a telegraphy receiver of the kind described in the preamble which has excellent frequency stability which is practically insensitive to atmospheric changes and which moreover renders the use of frequency control loops superfluous.

To this end such a receiver according to the invention comprises for each receiver channel a discriminator including a digital counter, a continuously active counting pulse generator coupled to the input of said counter and a decoder connected to said counter and having an output circuit formed by a register having a separate output for each of the different levels; and furthermore such a receiver has for each receiver channel a signal input circuit including a zero-crossing detector the output pulses of which are applied to said counter and to said register, the counter being reset to zero whenever such an output pulse occurs and the register being influenced by the same output pulse in such a manner that the signal occurring at the output of the decoder at the instant of resetting appears at the register output associated with the relevant level.

When using the step according to the invention the period between two instants characteristic of the input signal is measured with the aid of the counter, which instants may be two successive zero-crossings of the carrier frequency in which case the measured time interval corresponds to half a period; however, these zero-crossings may alternatively be chosen such that they are spaced over a given integer number of half periods.

Figure 2:
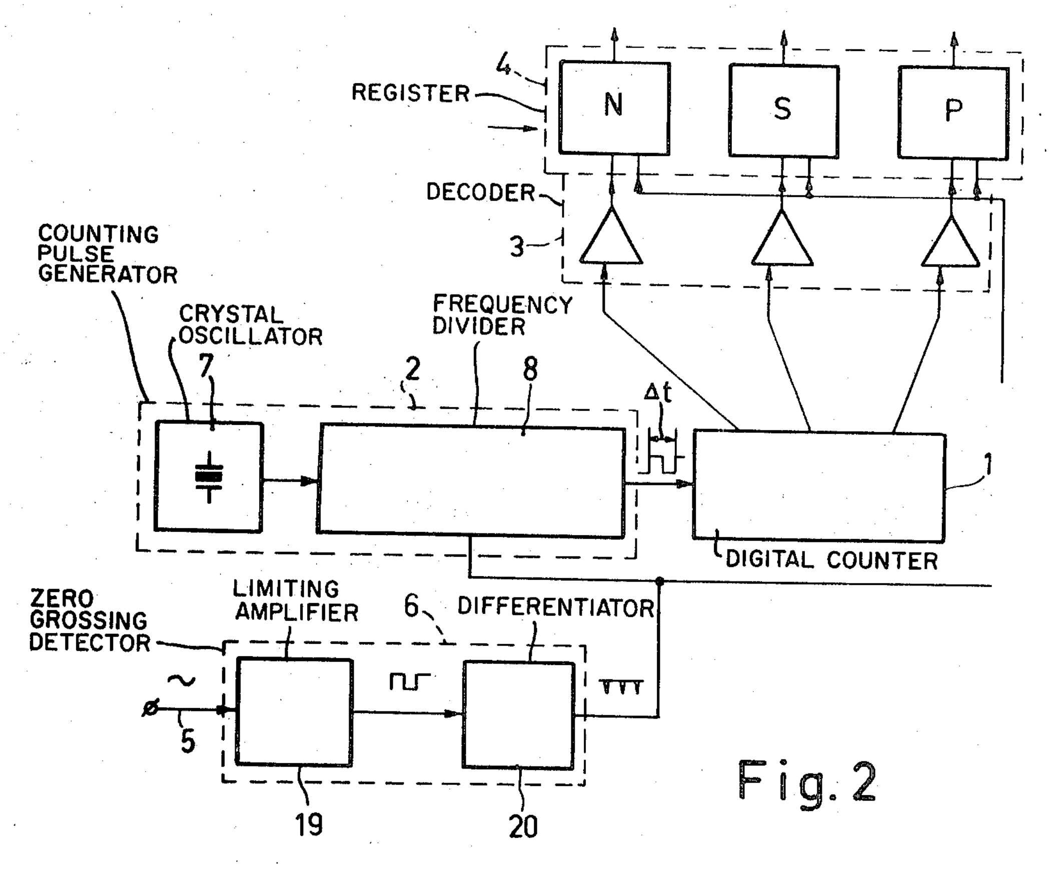
Figure 3:
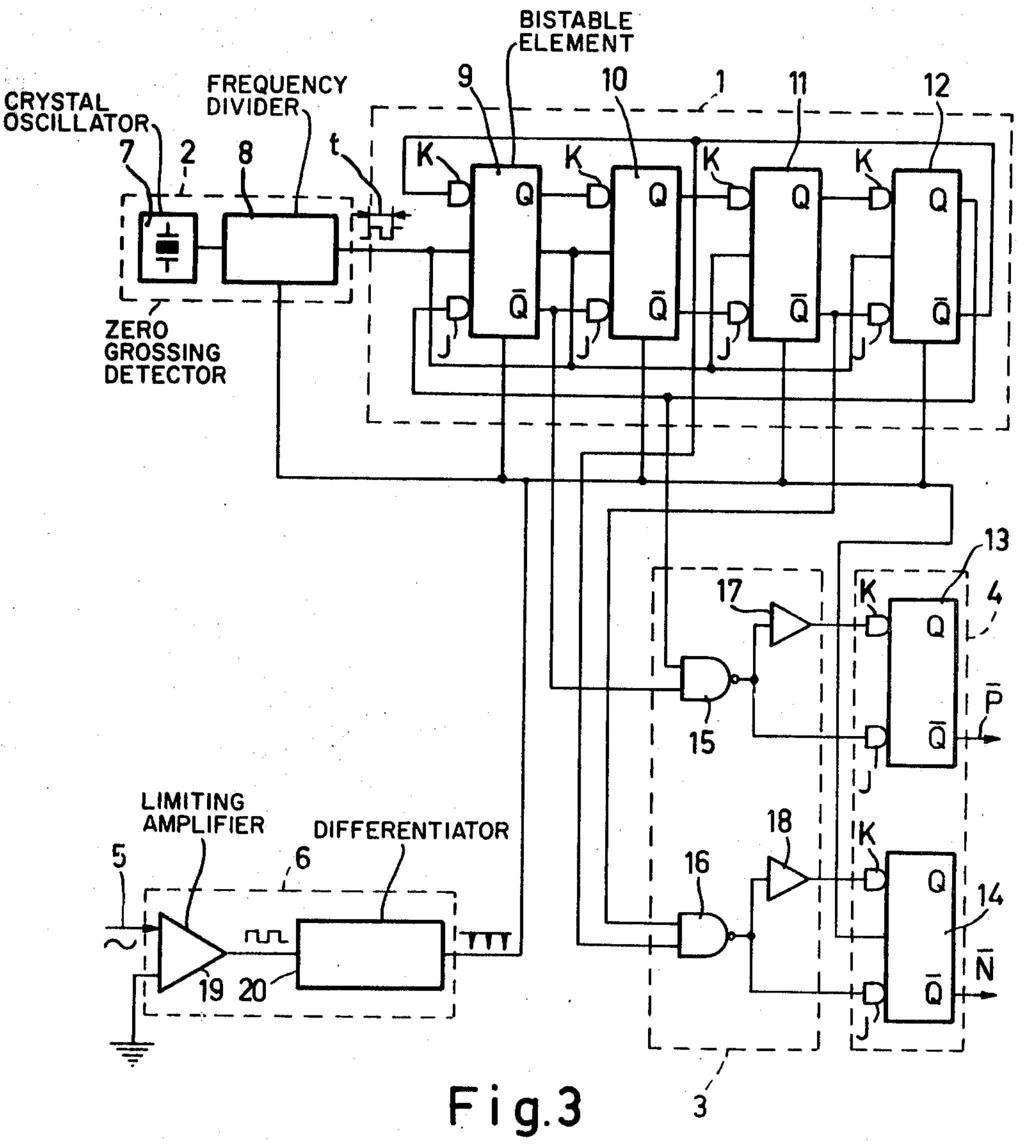
Figure 4A:
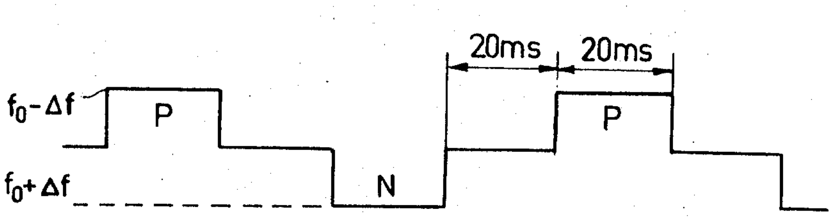
Figure 4B:
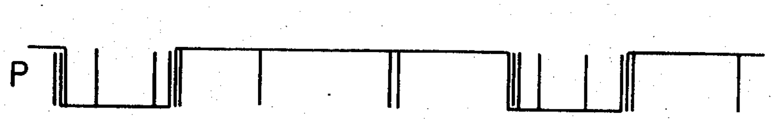
Figure 4C:
Figure 4D:
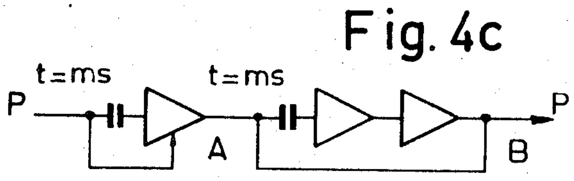
Figure 4E:
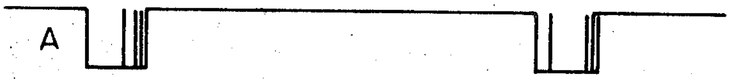
Figure 4F:
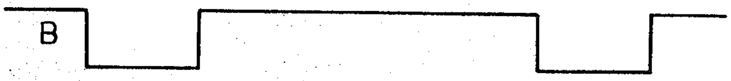
Figure 5:
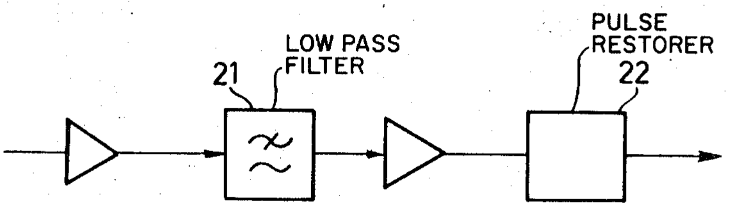
Figure 6:
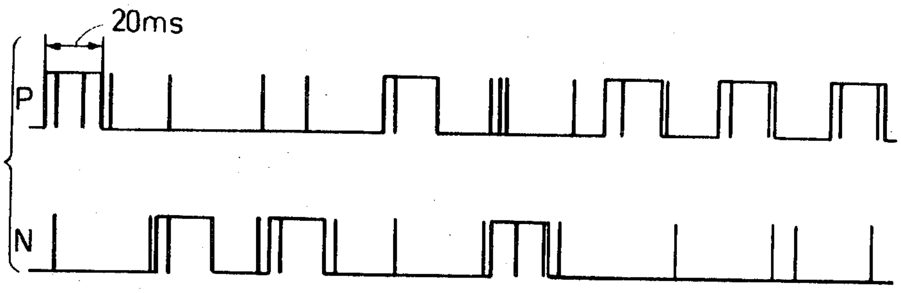
Figures 7, 8:
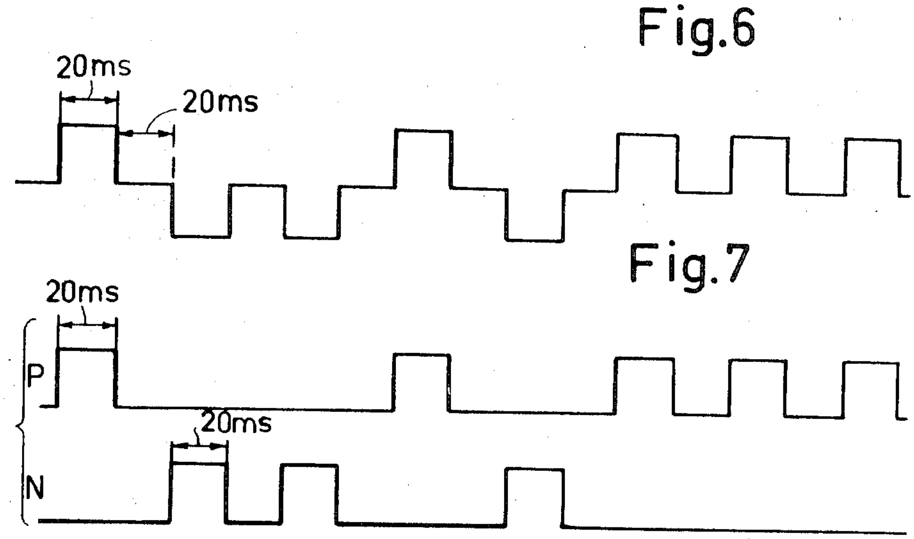
Figure 9:
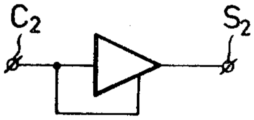
Figure 10:
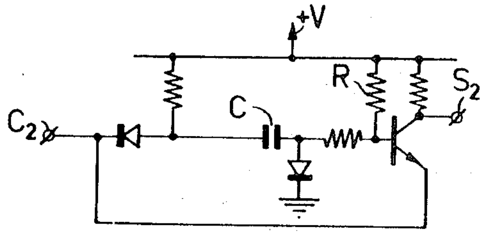

In order that the invention may be readily carried into effect a few embodiments thereof will now be described in detail by way of example with reference to the accompanying diagrammatic drawings in which:

FIG. 1 shows the period of time $\Delta t$ during which the counter does not change its counting position and the periods $t_p$ $t_s$ and $t_n$ which correspond to the three frequencies $fo$—30 Hz., $fo$ and $fo$+30 Hz. and the N-counter positions which are successively passed by the counter during the interval of time between the instant 0 and the instant $T_s$, FIG 2 shows a block diagram of an embodiment of a receiver channel of a receiver according to the invention which is suitable for use in a transmission system transmitting three levels at a transmission speed of 50 Bd, FIG. 3 shows a more detailed embodiment of such a channel, FIG. 4 shows a number of diagrams 4a, 4b, 4c, 4e and 4f of the signals as appear at the outputs P and N of the register which signals are shown for the case where a logic filter according to a further aspect of the invention is not used and for the case where such a filter is used for suppressing interferences occurring as a result of noise, FIG. 5 shows an embodiment of means generally used for the suppression of the above-mentioned noise interference, FIG. 6, 7 and 8 show diagrams of signals largely corresponding to those of FIGS. 4b, 4c, 4a and 4f, FIG. 7 corresponds to FIG. 4a and shows a square wave signal as transmitted in the case of the trivalent code (3 levels), FIG. 8 shows the diagram of the signals $\overline{P}$ and $\overline{N}$ as are obtained at the output of the bistable elements 5 and 6 (or P and N) of FIG. 3, FIG. 9 is a symbolic representation and FIG. 10 is a more detailed representation of the time constant circuit preceding the monostable circuit (FIG. 13) which combination brings about the filter action according to the invention as is shown in FIG. 4d.

Figure 11:
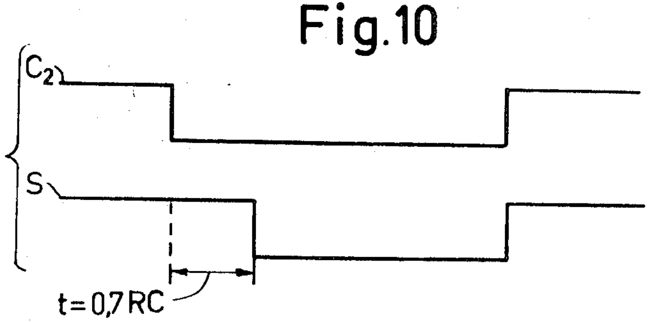
Figures 12, 13:
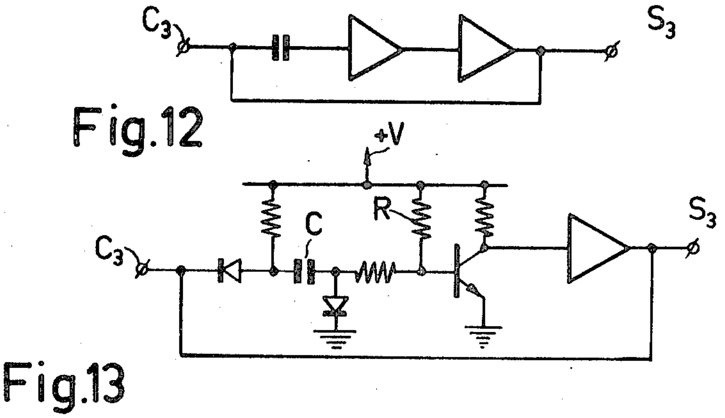

FIG. 11 shows the signals occurring at the points $C_2$ and $S_2$ of the time constant circuit of FIG. 10, FIGS. 12 and 13 show embodiments of the monostable circuit that is used in the structure of the logic filter 4d.

Figure 14:
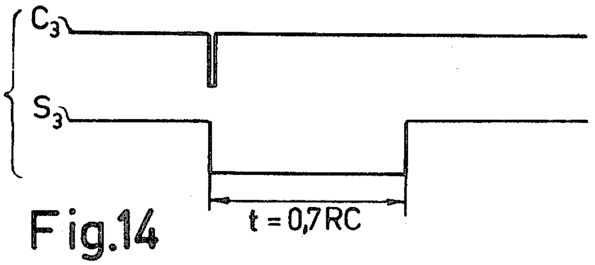
Figure 17:
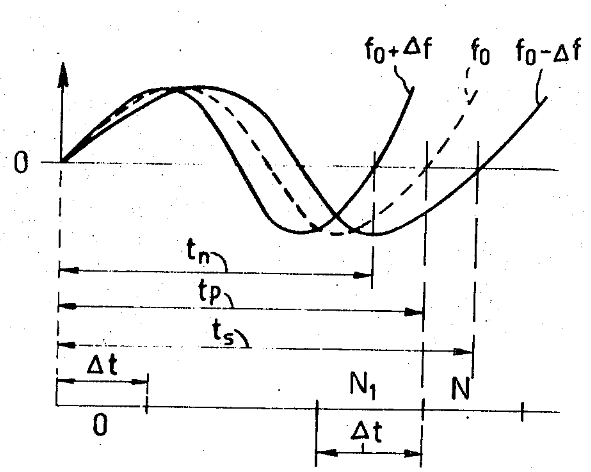
Figure 18:
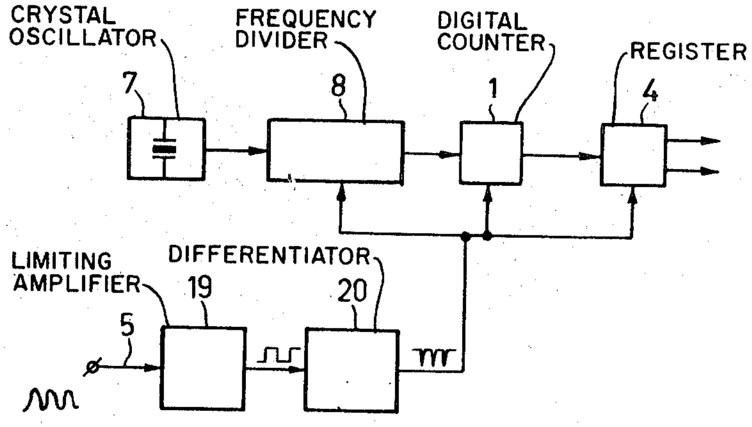

FIG. 14 shows the output signal which occurs at $S_3$ of the monostable circuit of FIG. 13 in response to an input signal at $C_3$, FIG. 15 is the diagram of the ultimate rectangular signals (line 15c) as occur at the output of the differentiating arrangement 12 of FIG. 3 and as are used for controlling the counter and the output register; line 15a shows the input signal and line 15b shows the output signal of the limiting amplifier 11, FIG. 16 shows a Table which is exclusively intended as an example and which denotes for each of the channels enumerated from 1 to 24 the crystal frequency for generating the desired succession of central frequencies and the values of the three characteristic frequencies S, P and N as are obtained in practice when the trivalent code is used (3 levels), FIG. 17 shows the interval of time $\Delta t$ during which the counter does not change its position, and the periods $t_n$, $t_p$ and $t_s$ which corresponds to the three frequencies $fo$—30 Hz.; $fo$ and $fo$+30 Hz., and the N counting positions which are successively passed by the counter during the interval of time between 0 and the instant $T_a$; the frequency $fo$ is then not transmitted; as this Figure shows the zero-crossing corresponding to this frequency accurately coincides with the limit between the two counting positions which correspond to the state N and the state P, respectively, FIG. 18 diagrammatically shows a discriminator according to the invention for use in a transmission system employing a bivalent code (2 levels).

Figures 15A, 15B, 15C:
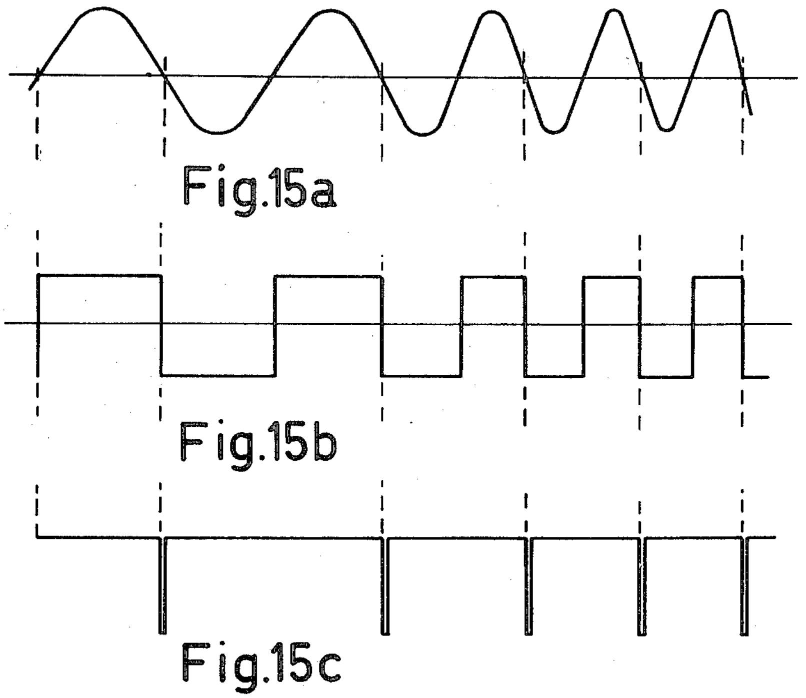

The circuit arrangement according to the invention the principle of which is shown in FIG. 2 comprises a discriminator which includes a digital counter 1, a counting pulse generator 2 coupled to the input of this counter and a decoder 3 connected to said counter, the output circuit of the decoder being formed by a register 4 having a separate output for each of the different levels, and a signal input circuit 5 including a zero-crossing detector 6 the output pulses of which are applied to said counter 1 and to said register 4. The input signal applied to the input circuit 5 is shown in FIG. 15a. This input signal varies between 3 frequency values $fo$—$\Delta f$, $fo$ and $fo$+$\Delta f$ which are characteristic of the levels T, S and N to be transmitted, respectively, in the case of a trivalent code. In FIG. 1 a period is shown for each of these frequencies. The intervals of time during which these periods occur are denoted in the Figure by $t_p$, $t_s$ and $t_n$, respectively. These intervals of time have a mutually different duration, that is to say, the instants when these periods cross zero are mutually different. In the present invention these differences are used as criteria for distinguishing the different frequencies. In fact, the time between two zero-crossings is measured with the aid of the counter 1. After each measurement the decoder 3 connected to the counter causes a signal to occur at one of the outputs of the register 4 dependent on the counter position reached after the measurement which position is representative for the frequency characterizing the level.

In the arrangement according to FIG. 3 the counting pulse generator is formed by a crystal oscillator 7 succeeded by a frequency divider 8. The counting pulses provided by this counting pulse generator are applied to the counter 1 which in the embodiment shown comprises 4 stages consisting of bistable elements 9, 10, 11 and 12, respectively. In the embodiment shown the register 4 is formed by two bistable elements 13 and 14. These bistable elements are connected to the counter 1 through the decoder 3 which has two "NAND" gates 15 and 16 and in which the output of gate 15 is directly connected to the input $j$ at one end and through an inverter 17 to the input $k$ of the bistable element 13 at the other end, while the output of gate 16 is connected directly to the input $j$ at one end and through an inverter 18 to the input $k$ of bistable element 14 at the other end.

The zero-crossing detector 6 incorporated in the input circuit 5 is formed in the embodiment shown by a limiting amplifier 19 converting the input signal, which has a more or less sinusoidal form, into rectangular pulses which are subsequently applied to a differentiating arrangement 20 the output pulses of which are applied to the frequency divider 8, to the bistable elements which constitute the counter 1 and the bistable elements 13 and 14 of the register 4. The last-mentioned register has in this case only two outputs $\overline{P}$ and $\overline{N}$ so that only two levels can be indicated. However, when the intermediate level $\overline{S}$ occurs it may be derived from the simultaneous absence of the levels $\overline{N}$ and $\overline{P}$.

When using the steps according to the invention a receiver for harmonic telegraphy having $n$ channels can be obtained wherein each channel is provided with a counter of the type described above. Thus the invention may be used, for example, in a telegraphy system for harmonic telegraphy having a transmission speed of 50 Baud and using 24 channels which are centered at the frequencies given by the formula: $f_k=60$ $(5+2ka)$, wherein $k$ is an integer between 1 and 24. Assuming one of these central frequencies to be equal to the frequency $fo$ the three frequencies characterizing the three levels to be transmitted can be indicated as follows:

Level P: $fo-30$ Hz.
Level S: $fo$
Level N: $fo$ 30 Hz.

In the embodiment shown in FIG. 3 these three frequencies are distinguished from one another with the aid of the digital counter 1 to which the counting pulses from the counting pulse generator 2 are applied. In this embodiment the discriminator is formed in such a manner that it measures the interval of time between two zero-crossings of the carrier, both zero-crossings being of the same type, i.e., both positive going or both negative going transitions. Whenever such a zero-crossing occurs the counter is reset to zero. The received frequency is characterized by the counting position present in the counter at the resetting instant.

When N indicates the number of positions successively occupied by the counter during the interval of time $t_s$ (see FIG. 1) the time during which the counter occupies a given counting position is given by: $\Delta t=t_s/N$.

The number N then determines the number of stages of the counter and the time $\Delta t$ determines the repetition frequency of the counting pulses to be applied to the counter. These two parameters must be chosen as a function of the frequency $fo$ and of the difference between the periods of the three carrier frequencies to be distinguished. A further condition is that:

$$4\Delta t=T_p-T_n \text{ (see FIG. 1)}$$

from which follows:

$$\Delta t=\tfrac{1}{4}\left(\frac{1}{f_n}-\frac{1}{f_p}\right)$$

$$=\tfrac{1}{4}\cdot\frac{f_p-f_n}{f_p\cdot f_n}$$

$$=\tfrac{1}{4}\cdot\frac{60}{f_p\cdot f_n}\approx\tfrac{1}{4}\frac{60}{f_o^2}$$

so that: $\Delta t=15/f_o^2$

Likewise there applies that:

$$N=T_s/\Delta t=(1/f_o)\cdot(f_o^2/15)=f_o/15,$$

that is to say:

$$N=\frac{60(5+2K)}{15}=20+8K$$

for which we can write:

$$N=16+4+8K=4+8(K+2)$$

Since noise may be superimposed on the received signal it must be taken into account that the measured duration of the periods is not entirely accurate. In connection therewith each frequency is not distinguished by a single counting position associated with this frequency, but by a number of successive counting positions each of which characterize one and the same frequency. In that case the detection criterion may be chosen, for example, in accordance with FIG. 1 in such a manner that:

Level P is characterized by each of the counting positions between the counting position $n+1$ and $n+3$.

Level S is characterized by each of the counting positions between the counting positions $n-1$ and the counting position $n$.

Level N is characterized by each of the counting positions between the counting position $n-4$ and the counting position $n-2$.

The minimum number of counting positions of the counter thus is: N+4 (the counting position 0 must be taken into account), that is to say: $8(k+4)$. Thus a simplification is obtained which consists in that a modulo-8-counter (8 counting positions) can be used in each channel instead of using a counter the number of counting positions of which is also determined by the channel and which may have 12 to 216 counting positions dependent on the channel.

This great simplicity can likewise be obtained in the case of a bivalent or trivalent code employing a transmission speed other than said 50 Baud in which of course a different discrimination criterion applies and the number of counting positions is larger or smaller than 8. During the measurement the counter K passes its complete counting cycle twice and stops during the subsequent counting cycle in one of its eight counting positions determined by the duration of one period of the relevant carrier frequency. The criterion of discrimination can then be written as follows:

Level P: $5 \leq$ counting position $\leq 7$
Level S: $3 \leq$ counting position $\leq 4$
Level N: $0 \leq$ counting position $\leq 2$ Since K does not exert influence any longer, this discrimination according to the invention may be used in all channels so that a counter having eight counting positions can be used in each channel.

Experiments were carried out with a receiver of the type shown in FIG. 3 in order to be able to determine the behavior of the receiver at different signal-to-noise ratios. The signal and the noise were measured at the output of the telegraphy filter associated with the receiver; thus in this case the signal-to-noise ratio in the passband of the channel is considered. Two kinds of noise are superimposed one after the other on the signal:

a. white noise
b. signal having a frequency arbitrarily chosen in the passband of the channel It was found that these two kinds of noise do not exert any mutually different influence on the behavior of the receiver. In case of unfavorable signal-to-noise ratios (in the order of 15 db.) the output signals showed interferences as may be seen in FIGS. *4a*, *4b*, *4c* and *6*. These interferences are the result of the uncertainty caused by the noise regarding the instant when the input signal crosses zero. Each point occurring in the diagram corresponds to a counting error over one or two periods of the signal; these errors particularly occur frequently in the vicinity of the zero-crossings. This difficulty also presents itself in the conventional receivers wherein the unwanted effects are largely eliminated by the inertia of the resonant circuits constituting the discriminator, though this goes at the expense of bandwidth. In the arrangement according to the invention these inaccuracies caused by the noise may be eliminated by means of a low-pass filter 21 as is shown in FIG. 5. This solution is costly because after filtering the signals, they must be reshaped by a pulse restorer 22 succeeding the filter. It is therefore preferred to carry out this filtering in a simpler and more economical manner with the aid of a logic circuit of the type comprising a circuit arrangement having a time constant and a monostable circuit such as shown in FIGS. 4*d* and 12.

FIG. 7 shows a transmitted signal having three different levels. When no interference occurs in the transmission path the output signals of the two bistable elements P and N of FIG. 3 may be represented by the diagrams shown in FIG. 8. The noise results in the zero-crossings showing arbitrary shifts so that the time measurement over certain periods of the carrier frequency is erroneous. Such errors will cause pulses to occur at the outputs of the bistable elements P and N, the duration of which pulses is equal to a period of the carrier frequency. When such a pulse is received the arrangement shown in FIGS. 9 and 19 produces an output signal as is shown in FIG. 11. The output signals occurring at P and N are filtered by means incorporated in the output lines as shown in FIG. 4*d*; filtering and regeneration are thus performed simultaneously. These filters are connected to the outputs $\overline{Q}$ of the bistable elements P and N, that is to say, the signals applied to the filters are inverted relative to those shown in FIG. 8. If the receiver is provided with such filters a signal-to-noise ratio of 12 db. is admissible.

As regards its use the receiver according to the invention is not limited to systems wherein three levels are transmitted, but is equally well usable for systems wherein only two levels are transmitted. Starting from the definitions as are given for the case of an input signal employing three levels it is possible to write for two levels:

(fo) $a{=}60(5{+}2k)$
$f_p{=}f_o{-}30$ Hz.
$f_n{=}f_o{+}30$ Hz.
(Only the frequencies $f_p$ and $f_n$ are transmitted).
Assuming that $\Delta t{=}T_p{-}T_n$ there follows that:

$$\Delta t=\frac{T_s}{N}=T_p-T_n=\frac{1}{F_p}-\frac{1}{F_n}=\frac{F_n-F_p}{F_n\cdot F_p}\#\frac{60}{f_o^2}$$

from which follows that:

$$N=\frac{T_s}{60}\times f_o^2=\frac{f_o^2}{60f_o}=\frac{f_o}{60}=5+2k,$$

that is to say, $$N{=}2(k{+}2){+}1.$$

From the above equation it may be derived that the counter having eight counting positions in the case of three frequencies may be replaced by a counter having two counting positions, that is to say, a single-stage counter. The criterion of discrimination becomes:

Level N . . . bistable in position 0
Level P . . . bistable in position 1.

The pulse repetition frequency $F$ of the counting pulses which are applied to the counter is:

$$F{=}1/\Delta t{=}N/t_s{=}f_o{\times}N{=}f_o^2/60{=}60(5{+}2k)^2.$$

The frequency of the crystal is:

$$F_g{=}60(5{=}2K)^2{\times}2^x$$

The value x (that is to say, the number of divider stages of the frequency divider) is preferably chosen to be such that the crystal frequency has a value of between 2 and 4 MHz.

In a receiver for a telegraphy system wherein only two levels are transmitted a register employing two bistable elements P and N need not any longer be used, because a single bistable element having positions 0 and 1 is sufficient. Each of the two outputs of this bistable circuit is provided with a filter of the type shown in FIG. 10 which provides the signals $C_2$ and $S_2$ which are applied to a bistable circuit formed by two "nand" gates and which provides an accurate reproduction of the transmitted signal.

FIG. 11 shows the signal which occurs at the output of the arrangement according to FIG. 10 when a rectangular signal is applied to the input thereof.

The aforedescribed embodiments of a receiver according to the invention may be used in a 24-channel telegraphy system wherein the input signals have two or three levels for each channel and wherein the transmission speed is 50 Baud which means that a bit has a duration $\Delta t$ of approximately 20 milliseconds.

Figure 19:
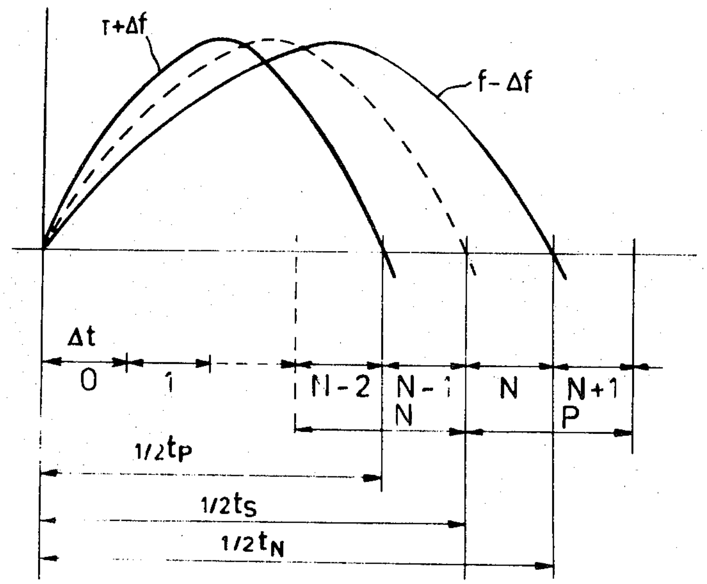

The receiver according to the invention may be alternatively realized advantageously in such a manner that it is usable in a 6-channel telegraphy system wherein the input signals have two or three levels and wherein the transmission speed is 200 Bd which means that the duration $\Delta t$ of a bit is approximately equal to 5 milliseconds, thus four times shorter. Such a receiver largely corresponds to the receiver described in the foregoing and is also based on the measurement of the duration between two zero-crossings, Considering the fact that the duration of a bit is only 5 milliseconds at a transmission speed of 200 Bd and that this corresponds for the lowest frequency to at least two periods of the carrier it is advantageous to measure the period between two directly succeeding zero-crossings of the carrier signal so as to reduce the distortion. Such a receiver is therefore distinguished from the receiver described in the foregoing in that the time measurement does not cover a full period of the carrier signal, but a half period as is shown in FIG. 19.

Finally it is to be noted that even when, by comparing a perfectly adjusted conventional telegraphy receiver with the receiver according to the invention, there is found no real difference in the transmission quality, the improvements and advantages of the receiver according to the invention still reside in the fact that:

the adjustment of the latter cannot be affected by atmospheric influences such as fluctuations in temperature;
the manufacture of certain parts of the receiver is better suitable for series manufacture;
space is economized.

In addition the receiver according to the invention has the important advantage that the crystal frequencies of the respective channels are identical to those of the transmitter described in the Netherlands Pat. No. 6,903,701 (PHN 3380). This is particularly interesting for obtaining a "modem" since in that case the oscillator and part of the frequency divider can be combined. For the crystal frequencies to be used reference is made to the table shown in FIG. 16.

What is claimed is:

1. A multichannel telegraphy receiver for harmonic telegraphy wherein for each channel different levels of the input signal are characterized by different frequencies of the carrier; each receiver channel comprising a discriminator including a digital counter; a continuously active counting pulse generator coupled to the input of the counter and comprising a pulse oscillator, a frequency divider connected to the pulse oscillator and having $x$ divider stages, each of the output pulses of the divider being representative of a counter time increment $\Delta t$, the oscillator frequency being equal to $F{=}2^x/\Delta^t$; a decoder connected to the counter and comprising a register having a separate output for each of the different channel levels; a receiver channel input circuit, comprising a zero-crossing detector having output pulses, means for connecting the output pulses of the zero-crossing detector as reset pulses to the digital counter and means for applying the output pulses of the zero-crossing detector to the output register as readout pulses for reading the output of the decoder into the output line of the register corresponding to the input frequency of the carrier.

2. A multichannel telegraphy receiver as claimed in claim 1, wherein the number of divider stages $x$ of the frequency divider is chosen to be such that the oscillator frequency $F$ is between 2 and 4 MHz.

3. A multichannel telegraphy receiver as claimed in claim 1 having three levels for each receiver channel which levels are characterized by the frequencies $f_o{-}\Delta f$, $f_o$ and $f_o{+}\Delta f$ respectively, wherein the discriminator is formed in such a manner that the following relations exist between the intervals of time $t_p$, $t_s$ and $t_n$ corresponding to one period of the frequencies $f_o-\Delta f, f_o$ and $f_o+\Delta f$, and the duration of one time increment $\Delta t$:

$$\Delta t = t_s N$$

and $$4\Delta t = t_p - t_n$$

wherein N is equal to the number of counting positions successively passed by the counter during the interval of time $t_s$.

4. A multichannel telegraphy receiver as claimed in claim 1 having three levels for each channel which levels are characterized by the frequencies $f_o-\Delta f$, $f_o$ and $f_o+\Delta f$, respectively, wherein the discriminator is formed in such a manner that the following relations exist between the intervals of time $t_p$, $t_s$ and $t_n$ corresponding to one period of the frequencies $f_o-\Delta s, f_o$ and $f_o+\Delta s$, respectively, and the duration of one time increment $\Delta t$:

$$\Delta t = t_s/2N$$

and $$4\Delta t = t_p - t_n/2$$

wherein N is equal to the number of counting positions successively passed by the counter during the interval of time $t_s$.

* * * * *

PO-1050
(5/69)

UNITED STATES PATENT OFFICE
CERTIFICATE OF CORRECTION

Patent No. 3,647,967 Dated March 7, 1972

Inventor(s) MICHEL GUY PIERRE STEIN

It is certified that error appears in the above-identified patent and that said Letters Patent are hereby corrected as shown below:

Col. 3, line 31, "(5+2ka)" should be --(5+2k)--;

Col. 3, line 37, "fo 30 Hz." should be --fo+30 Hz.--;

Col. 5, line 60, "$F_9$" should be --$F_q$--;

IN THE CLAIMS

Claim 3, line 8, "$t_g N$" should be --$\frac{t_s}{N}$--.

Signed and sealed this 18th day of July 1972.

(SEAL)
Attest:

EDWARD M.FLETCHER,JR.
Attesting Officer

ROBERT GOTTSCHALK
Commissioner of Patents

PO-1050
(5/69)

UNITED STATES PATENT OFFICE
CERTIFICATE OF CORRECTION

Patent No. 3,647,967 Dated March 7, 1972

Inventor(s) MICHEL GUY PIERRE STEIN

It is certified that error appears in the above-identified patent and that said Letters Patent are hereby corrected as shown below:

ON THE TITLE PAGE

"[30] Foreign Application Priority Data

Feb. 26, 1969 France...................6923464"

should be

--[30] Foreign Application Priority Data

Feb. 26, 1969 France................ 6904923--.

Signed and sealed this 31st day of October 1972.

(SEAL)
Attest:

EDWARD M.FLETCHER,JR.
Attesting Officer

ROBERT GOTTSCHALK
Commissioner of Patents